US012619517B2

(12) United States Patent
Bazzo

(10) Patent No.: US 12,619,517 B2
(45) Date of Patent: May 5, 2026

(54) ARTIFICIAL INTELLIGENCE-ASSISTED TROUBLESHOOTING FOR APPLICATION DEVELOPMENT TOOLS

(71) Applicant: SAP SE, Walldorf (DE)

(72) Inventor: Vitor Eduardo Seifert Bazzo, St. Leon Rot (DE)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 18/386,030

(22) Filed: Nov. 1, 2023

(65) Prior Publication Data

US 2025/0138986 A1 May 1, 2025

(51) Int. Cl.
*G06F 11/362* (2025.01)

(52) U.S. Cl.
CPC .................................. *G06F 11/362* (2013.01)

(58) Field of Classification Search
None
See application file for complete search history.

(56) References Cited

U.S. PATENT DOCUMENTS

2006/0149751 A1* 7/2006 Jade ........................ G06F 9/451
2020/0327444 A1* 10/2020 Negi .................. G06Q 30/0631
2021/0082561 A1* 3/2021 Chang ..................... G16H 40/63
2024/0311274 A1* 9/2024 Dolga ................. G06F 11/3612
2024/0378399 A1* 11/2024 Gandhi ................... G06F 40/40
2024/0385942 A1* 11/2024 Hawker .............. G06F 11/0793
2025/0045148 A1* 2/2025 Acharya ............... G06F 11/079
2025/0094473 A1* 3/2025 Wilczynski ........... G06F 16/345

OTHER PUBLICATIONS

R. Bairi et al., "CodePlan: Repository-Level Coding using LLMs and Planning," Sep. 21, 2023, arXiv:2309.12499v1 [cs.SE]. (Year: 2023).*

J. Cao et al., "A study on Prompt Design, Advantages and Limitations of ChatGPT for Deep Learning Program Repair," Apr. 17, 2023, arXiv:2304.08191v1 [cs.SE]. (Year: 2023).*

"How to Analyze Logs Using Artificial Intelligence", LogicMonitor, [Online]. Retrieved from the Internet: <URL: https://www.logicmonitor.com/blog/how-to-analyze-logs-using-artificial-intelligence>, (Accessed Sep. 13, 2023), 4 pgs.

(Continued)

*Primary Examiner* — Andrew M. Lyons
(74) *Attorney, Agent, or Firm* — SCHWEGMAN LUNDBERG & WOESSNER, P.A.

(57) ABSTRACT

Systems and methods described herein relate to automated troubleshooting for application development tools. First data comprise a plurality of delta objects and a user query. The plurality of delta objects identify design-time changes made to an application using a development tool. The user query is received via a user interface and relates to at least one of the design-time changes. The first data is preprocessed to obtain second data. The preprocessing of the first data includes modifying a subset of the first data and adding one or more predetermined instructions to the first data. The second data is provided to a machine learning model to obtain a response to the user query. Output indicative of the response is caused to be presented in the user interface.

20 Claims, 8 Drawing Sheets

(56) References Cited

OTHER PUBLICATIONS

"Identify, Redact, and Replace Personally Identifiable Information in Unstructured Text", Private AI, [Online]. Retrieved from the Internet: <URL: https://www.private-ai.com/products/text/>, (Accessed Sep. 18, 2023), 12 pgs.
"Prompt Engineering", Great Learning, [Online]. Retrieved from the Internet: <URL: https://www.mygreatlearning.com/blog/prompt-engineering-complete-guide/>, (Jun. 20, 2023), 10 pgs.
Gildeh, David, "Log Analysis with Machine Learning: An Automated Approach to Analyzing Logs Using ML/AI", Zebrium, [Online]. Retrieved from the Internet: <URL: https://www.zebrium.com/blog/part-1-machine-learning-for-logs>, (Accessed Sep. 13, 2023), 9 pgs.
Menzli, Amal, "A Machine Learning Approach to Log Analytics: How to Analyze Logs?", Neptune Labs, [Online]. Retrieved from the Internet: <URL: https://neptune.ai/blog/machine-learning-approach-to-log-analytics>, (Aug. 21, 2023), 13 pgs.
Pan, Jonathan, "AI based Log Analyser: A Practical Approach", arXiv:2203.10960v2, (Apr. 20, 2023), 5 pgs.
Shash, Max, "Using Machine Learning for Log Analysis and Anomaly Detection: A Practical Approach to Finding the Root Cause", [Online]. Retrieved from the Internet: <URL: https://dzone.com/articles/using-machine-learning-for-log-analysis-and-anomal>, (Nov. 5, 2021), 3 pgs.
Sriharsha, M S, "Detecting and redacting PII using Amazon Comprehend", AWS Machine Learning Blog, [Online]. Retrieved from the Internet: <URL: https://aws.amazon.com/blogs/machine-learning/detecting-and-redacting-pii-using-amazon-comprehend/>, (Sep. 17, 2020), 13 pgs.
Thaine, Patricia, "Demystifying De-identification", Toward Data Science, [Online]. Retrieved from the Internet: <URL: https://towardsdatascience.com/demystifying-de-identification-f89c977a1be5>, (Apr. 6, 2021), 6 pgs.
"European Application No. 24199950.07 Extended European Search Report mailed on Mar. 11, 2025", 8 pgs.
"Announcing OpaquePrompts Hide your sensitive data from LLMs", Walden Catalyst Wayback Machine, accessed on Feb. 25, 2025, 4 pgs.
Ramakrishna, Bairi, "CodePlan Repository-level Coding using LLMs and Planning", Cornell University Library ARXIV, Sep. 21, 2023, 34 pgs.

* cited by examiner

128

TROUBLESHOOTING SYSTEM

202 — USER INTERFACE COMPONENT

204 — QUERY DATA PREPROCESSING COMPONENT

206 — CHANGE FILE SELECTION COMPONENT

208 — CHANGE DATA PREPROCESSING COMPONENT

210 — MODEL INSTRUCTIONS COMPONENT

212 — PROMPT GENERATION COMPONENT

214 — MODEL INTERFACE COMPONENT

216 — RESPONSE GENERATION COMPONENT

300

START ~ 302

RECEIVE A USER QUERY VIA A USER INTERFACE PRESENTED AT A USER DEVICE ~ 304

SELECT DELTA OBJECTS ~ 306

PREPROCESS THE DELTA OBJECTS ~ 308

ADD PREDETERMINED INSTRUCTIONS TO OBTAIN A PROMPT ~ 310

PROVIDE THE PROMPT TO A MACHINE LEARNING MODEL ~ 312

RECEIVE A RESPONSE FROM THE MACHINE LEARNING MODEL ~ 314

POSTPROCESS THE RESPONSE ~ 316

CAUSE PRESENTATION OF THE POSTPROCESSED RESPONSE IN THE USER INTERFACE AT THE USER DEVICE ~ 318

END ~ 320

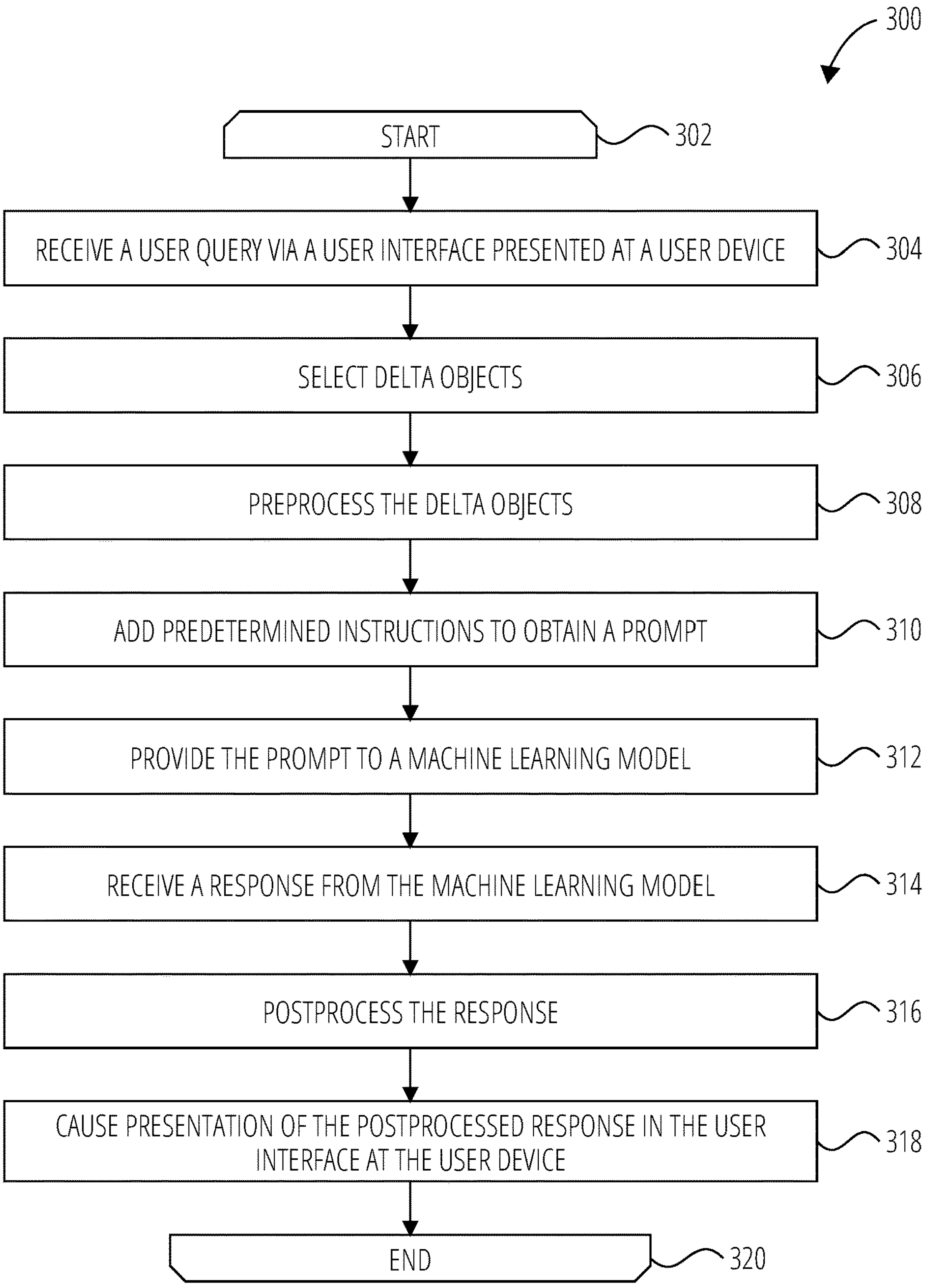

FIG. 3

ARTIFICIAL INTELLIGENCE-ASSISTED TROUBLESHOOTING FOR APPLICATION DEVELOPMENT TOOLS

TECHNICAL FIELD

The subject matter disclosed herein generally relates to systems and methods for troubleshooting in the context of an application development tool. More specifically, examples described herein relate to artificial intelligence-assisted troubleshooting with respect to design-time changes made to a software application using an application development tool.

BACKGROUND

Various application development tools exist. Some application development tools track design-time changes made to a software application by generating and storing change files. A change file may describe a specific change made relative to a template version, or base version, of the application and previous change files. For example, when a user makes a change to the design of a user interface using a development tool, such as SAPUI5™, the change is recorded in a change file that has a standardized structure and format (e.g., a JSON (JavaScript Object Notation) file is stored to indicate that "Button A" was renamed from "START" to "GO").

Over time, applications can accumulate large numbers (e.g., hundreds) of change files. When a problem occurs, a troubleshooting process may involve reviewing these change files to identify root causes or other potential issues to be addressed. For example, a support user may need to locate a design-time change that was not correctly applied in the application and is causing runtime errors. However, analyzing such change files may be time-consuming or error-prone, and the existence of dependences or interrelations between the change files may increase the complexity of the task.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

FIG. 3 is a flowchart illustrating operations of a method suitable for processing a user query related to one or more changes made to an application, and providing a response to the user query, according to some examples.

DETAILED DESCRIPTION

Figure 1:
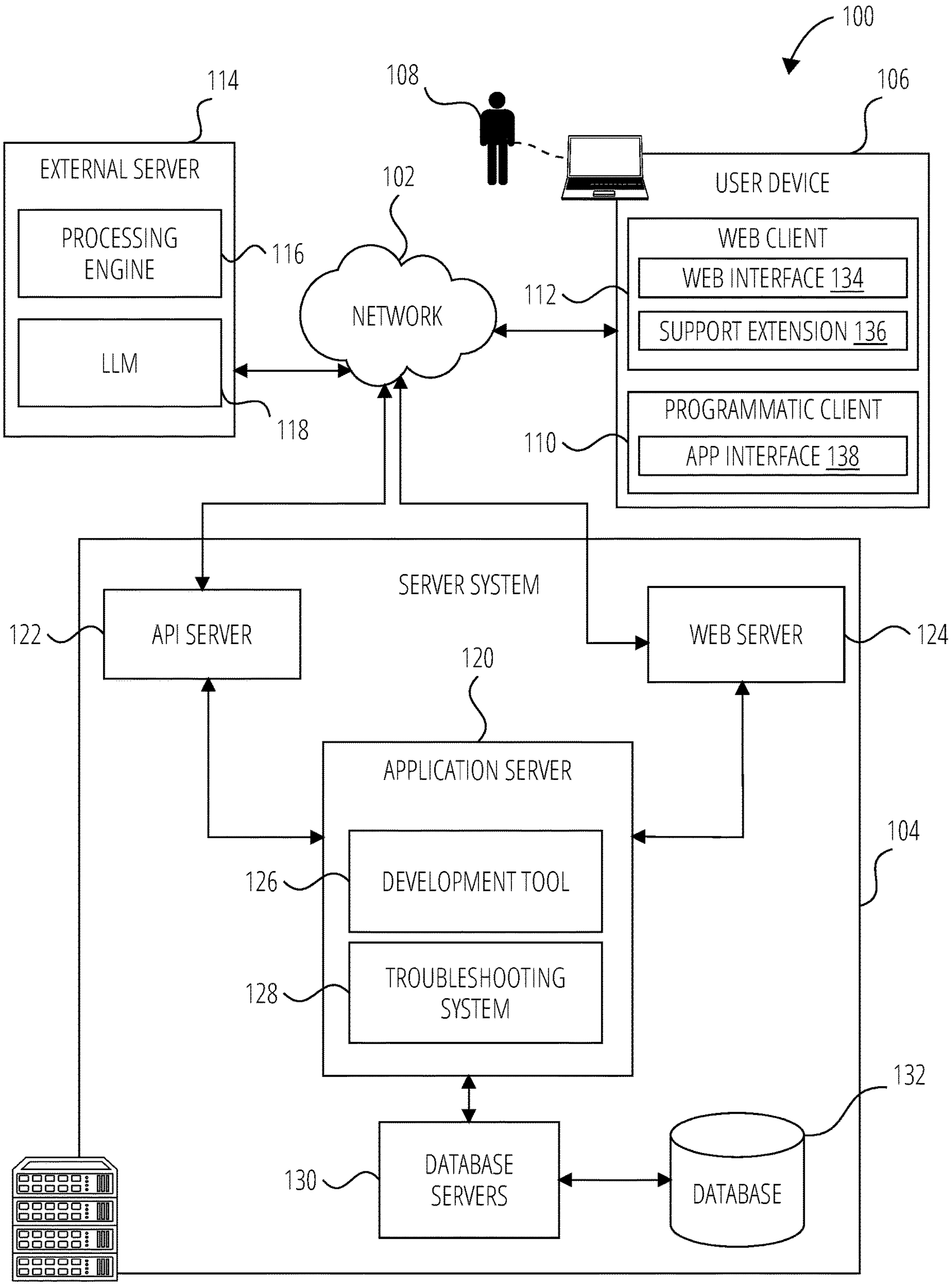
FIG. 1 is a diagrammatic representation of a network environment that includes a development tool and a troubleshooting system suitable for use with the development tool, according to some examples.

Systems and methods described herein leverage artificial intelligence (AI) technology to provide a troubleshooting tool for user support in the context of application development. As used herein, the term "application development tool," or simply "development tool," refers to a software platform or framework that provides capabilities, features, or functionality to design, create, modify, edit, and configure applications, or parts of applications (such as user interface layers of applications).

A development tool may offer templates or other reusable components that can be selected by users to simplify development, save time, or facilitate standardization or uniformity. While templates can be used as-is, it is often desirable to make certain changes to a template before proceeding to production. For example, a development tool may provide various user interface templates. A user can select one of the templates and then adjust aspects thereof, such as its layout, style, colors, text, buttons, or spacings. The user may also wish to add additional elements to or remove elements from the template. These adjustments can be referred to as design-time changes. It is noted that such changes may be made by different types of users, such as a developer (e.g., a developer using an editor tool such as SAP Business Application Studio™) or an end user (e.g., an end user using another editor tool running on top of an application at an end user device).

The term "design-time change," as used herein, refers to a change, modification, deletion, customization, or update made to an application (or part thereof) during design, development, or adaptation of the application (or part thereof). Design-time changes can include, for example, adding or changing application logic, adding or changing modules, designing or adapting a user interface (e.g., changing a user interface layout, or adding, adjusting, moving, or renaming user interface elements), adding or changing data schemas or structures, or configuring application features. Design time is contrasted with a compiling stage, when source code is translated to executable code, and with runtime, when an application is run.

In some cases, design-time changes can be tracked by storing snapshots of an application at different points in time. For example, user interface changes may be tracked by storing a snapshot each time a change is made, thereby allowing a user to review how the user interface has changed from an initial template or earlier version. A second approach is to maintain the initial template and store the design-time changes themselves (as opposed to creating and storing an overall snapshot). Design-time changes may be stored in separate change files, where each change file describes a change, or "delta," with respect to a template version, or base version, as well as any earlier change files (if applicable).

When utilizing the second approach described above, design-time changes can be tracked as delta objects. The term "delta object," as used herein, refers to a data item or data structure that represents, identifies, or describes one or more changes or differences between two versions or states of an application, or between two versions or states of a component of an application. For example, in the context of user interface design, when a user renames "Button A" from "START" to "GO," a delta object may be generated and stored to describe the change (or "delta"). A change file may contain one or more multiple delta objects. A change file is contrasted with a log file, as a log file contains runtime information, while a change file describes one or more design-time changes.

A delta object describes a change made during design time. In the context of this disclosure, a delta object differs from a log file that is created during runtime or that is based on runtime events. Accordingly, while the changes described by delta objects may be implemented or applied at runtime when the application is used, the delta objects are not created at runtime or based on runtime events.

A potential benefit of storing delta objects is that a different subset of delta objects may be selected and analyzed based on context. For example, different users, different development environments, or different versions of an application may be associated with different sets of delta objects. For example, a first user may be working on one instance of the application that is customized for a first operating environment, while a second user may be working on another instance of the application that is customized for a second operating environment. A different subset of delta objects may be relevant to each instance. This context is referred to in this disclosure as the "application context."

However, analyzing multiple individual change files that depend on or impact each other can be significantly more complex than comparing snapshots. Delta objects can be stored as change files (e.g., JSON files) that become extensive if the application is modified many times, with interdependencies existing between at least some of the change files. When a customer incident occurs, these delta objects may need to be checked manually. For example, a support user may first try to identify the correct subset of delta objects that applies to the application context. Then, the support user may review and identify dependencies, the order of execution or modification, and any contrasting instructions. Further, the support user may access runtime data to check whether changes were successfully applied.

Examples described herein allow for AI-assisted troubleshooting with respect to design-time changes made to an application. In some examples, changes made to an application are extracted at a user device (e.g., by a support extension to a browser) and provided to a troubleshooting system. The troubleshooting system is communicatively coupled to a machine learning model, such as a generative AI model (e.g., a large language model (LLM)) that is trained to receive and respond to natural language prompts. A user-friendly troubleshooting or debugging tool may be provided that allows a user to ask questions and obtain useful information regarding design-time changes made to an application, thereby saving time and adding a layer of automation to a problem-solving process.

A method may include accessing a plurality of delta objects. The method may also include accessing a user query. First data accessed by a system may include the plurality of delta objects and the user query. The plurality of delta objects may identify design-time changes made to an application using a development tool. The user query may be received via a user interface, such as a troubleshooting interface of a development tool.

The user query may be a natural language query, such as a question or request submitted by an end user. The end user may, for example, be a support user or a developer. For example, the user query may relate to at least one of the design-time changes (e.g., "What changes were made to Button A in the past month?").

The design-time changes may include changes made to a user interface layer of the application. For example, where the user interface layer is based on a template or base version supported by the development tool, the respective delta objects may track design-time changes relative to the template or base version and earlier delta objects.

The method may include preprocessing the first data to obtain second data. The preprocessing of the first data may include modifying a subset of the first data and adding one or more predetermined instructions to the first data. The predetermined instructions may be natural language instructions. The second data may collectively form a prompt that is provided to the machine learning model.

In some examples, the first data (e.g., at least some of the delta objects) are modified to reduce an overall token size thereof. One or both of the user query and the delta objects may be modified. A subset of the first data may be modified by replacing certain original data items in the first data with alternative data items. For example, data items in the first data that include personally identifiable information (PII) may be automatically detected and replaced with alternative data items, such as placeholder data items.

The method may thus include replacing original data items in the first data with alternative data items to de-identify the first data prior to providing the data to a machine learning model. In some examples, data items containing PII may be hashed to de-identify them and simultaneously reduce token size.

The second data may be provided to the machine learning model to obtain a response to the user query. The response may be postprocessed to obtain output for presentation in the user interface (e.g., at a user device of a user). The postprocessing may include performing re-identification by replacing one or more alternative data items included in the response from the machine learning model with one or more corresponding original data items from the first data. Where other placeholder data items are used (e.g., not de-identification items), postprocessing may include replacing one or more placeholder data items included in the response from the machine learning model with one or more corresponding original data items from the first data.

As mentioned, predetermined instructions may be added to the first data (e.g., to the first data that includes modified delta objects). The predetermined instructions may include a pre-engineered prompt that is added to the first data to obtain a final prompt for input to the machine learning model. The predetermined instructions may include one or more of: contextual information relating to the plurality of delta objects, contextual information relating to the application, a task specification, a role assigned to the machine learning model, a prescribed output format for the response, or one or more output constraints.

In some examples, the response from the machine learning model (e.g., the LLM) is a natural language response. The natural language response may be in an unstructured format. The method may include postprocessing the response from the machine learning model to obtain the output for presentation in the user interface by converting the response from the unstructured format to a structured format (e.g., a predefined user interface table format).

Each of the delta objects may be stored in a respective change file that describes one or more of the design-time changes. In some examples, additional information relating to the design-time changes may be added when the preprocessing operation is performed. For example, the method may include retrieving runtime data and adding the runtime data to form part of the second data. For example, for a change described by a delta object, runtime data may be retrieved that indicates whether the change was successfully applied. This may provide the machine learning model with additional context, such as details of which changes were persisted.

Examples described herein may address or alleviate the technical problem of efficiently analyzing large sets of interrelated change files (e.g., to troubleshoot issues experienced with complex applications). In some examples, delta objects are selectively sent to a machine learning model to generate responsive troubleshooting insights. A subset of delta objects may be intelligently selected based on application context.

A technical improvement may be provided by enabling more efficient (e.g., more rapid) review of extensive change files that can have dependencies and relationships that make manual analysis time-consuming or error-prone. By using natural language processing and machine learning techniques to parse change files together with additional information and generate responses to user queries, examples described herein may automate at least part of a change file review process. This may save time or improve detection accuracy.

Data may be preprocessed prior to providing the data to the machine learning model to automatically de-identify inputs or reduce overall token size. Examples described herein may utilize data masking, hashing, or placeholders to protect data privacy or reduce the size of input data. Examples described herein may thus automatically reduce the size of input data sets provided to a machine learning model to reduce the computing resources required to provide a troubleshooting tool or to allow for processing of larger data sets. Examples of such computing resources may include processor cycles, network traffic, memory usage, graphics processing unit (GPU) resources, data storage capacity, power consumption, and cooling capacity.

In some examples, a technique described herein effectively combines a user query with delta objects and predetermined instructions (e.g., contextual information) to provide enhanced troubleshooting capabilities and allow for efficient analysis of complex interrelated delta objects. The integration of components or techniques described herein into a development tool may improve the functioning or performance thereof, and provide a better user experience (e.g., as a result of more robust troubleshooting and debugging, more intuitive interfaces, or more responsive support features).

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an "app") may be hosted and executed on the user device 106.

An Application Program Interface (API) server 122 and a web server 124 provide respective programmatic and web interfaces to components of the server system 104. A specific application server 120 hosts a development tool 126 and a troubleshooting system 128, which includes components, modules, or applications. It will be appreciated that the development tool 126 and the troubleshooting system 128 may be hosted on different application servers in other examples.

The user device 106 can communicate with the application server 120, e.g., via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. For example, multiple users may access the development tool 126 using respective user devices to utilize its functionality, while one or more users (e.g., a support user) may access the troubleshooting system 128 to utilize its functionality. Further, while certain functions may be described herein as being performed at either the user device 106 (e.g., web client 112 or programmatic client 110) or the server system 104, the location of certain functionality either within the user device 106 or the server system 104 may be a design choice.

The application server 120 is communicatively coupled to database servers 130, facilitating access to one or more information storage repository, e.g., a database 132. In some examples, the database 132 includes storage devices that store information to be processed by the troubleshooting system 128 or other components shown in FIG. 1. For example, the database 132 may store change files that include delta objects that are accessed by the troubleshooting system 128.

The application server 120 accesses application data (e.g., application data stored by the database servers 130) to provide one or more applications, software tools and support tools to the user device 106 via a web interface 134 or an app interface 138. The development tool 126 and the troubleshooting system 128 are described below.

The development tool 126 may provide an application development environment or framework that enables users to build, modify, or extend applications. The development tool 126 may include a visual designer feature that allows users to compose and customize application user interfaces (e.g., using a drag-and-drop interface or other user-friendly mechanism). For example, developers can add, remove, or modify user interface elements, such as buttons, input fields, tables, and charts.

Accordingly, in some examples, the development tool 126 can be used to design and adapt a user interface layer of an application, including graphical layouts, visual elements, and interactive components displayed to and interacting with end users. The development tool 126 may further allow a user to integrate front-end elements with back-end elements, such as data sources, logic components, and other applications.

The user 108 may use the web interface 134 of the web client 112 of the user device 106 to access the environment or framework provided by the development tool 126. For example, the web client 112 may transmit instructions to and receive responses from the server system 104 to allow it to update a user interface, creating a dynamic and interactive web application experience. In other examples, the development tool 126 may run on the web client 112 the user interface can be updated without transmitting instructions to and receiving response from the server system 104. Accordingly, while the development tool 126 is shown as residing within the server system 104 in FIG. 1, it will be appreciated that functionality or features of the development tool 126 may be provided so as to run fully or partially at the user device 106, such as on the web client 112.

The development tool 126 may manage change files to track changes made by users. For example, when the user 108 makes a change to a user interface, the web client 112 may extract the change as a delta object. The delta object may be stored in the database 132 or locally at the user device 106. In some examples, the development tool 126 caters for different user types. For example, a user may access the development tool 126 as a "key user" or an "end user." If a key user makes changes to an application, the changes are carried through to all instances of the application. If an end user makes changes to an application, the changes only apply to that specific user's instance of the application. Accordingly, an application context may include whether a design-time change was made by a key user. In the context of business application design, for example, a key user is typically an individual with deep business knowledge who understands how other users within an organization may use an application, and has the skills or experience to improve or optimize the application.

The development tool 126 may also provide a runtime environment where users can execute and interact with the applications they build. This may include, for example, a console to view logs and runtime data generated during application execution. The development tool 126 may allow a user to view both design-time changes (e.g., as change files) and runtime behaviors observed when executing the application.

In some examples, the development tool 126 stores change files (and, in some cases, also runtime logs) in a centralized location and provides interfaces to access this data. For example, when troubleshooting, the troubleshooting system 128 can retrieve relevant data from the development tool 126 to identify any changes or anomalies that may be contributing to application issues.

The development tool 126 may provide the user 108 with access to various templates, such as different user interface templates for use in applications. In some examples, the troubleshooting system 128 allows the user 108 to more easily troubleshoot, understand, or gather information regarding design-time changes that were made relative to an initially selected template.

The troubleshooting system 128 may facilitate resolving or troubleshooting of issues by the user 108. For example, when the user 108 is experiencing bugs, defects, deployment problems, or simply has a query, the troubleshooting system 128 may be used to provide assistance. While the troubleshooting tool 128 is shown as residing within the server system 104 in FIG. 1, it will be appreciated that at least some functionality or features of the troubleshooting tool 128 may be provided so as to run at the user device 106, such as on the web client 112, as described further below.

In some examples, the troubleshooting system 128 provides AI-assisted troubleshooting capabilities through natural language interactions. The troubleshooting system 128 may receive user queries, process delta objects (e.g., in change files), preprocess data, provide prompts to a machine learning model to obtain responses to user queries, and postprocess such responses. Accordingly, the troubleshooting system 128 may allow the user 108 to ask natural language questions, or submit natural language requests, related to issues experienced with respect to an application being developed using the development tool 126, and receive natural language responses.

For example, the machine learning model may be hosted on an external server 114 that provides a processing engine 116 and a trained model, such as an LLM 118, as shown in FIG. 1. However, in other examples, the machine learning model may be internally hosted.

The troubleshooting system 128 may add an AI-powered, conversational troubleshooting experience "on top of" a standard user interface provided by the web client 112 and web interface 134 at the user device 106. For example, the troubleshooting system 128 may provide or communicate with a support extension 136 at the user device 106. The support extension 136 may be a browser extension that extends the functionality of the web client 112 specifically for AI-driven troubleshooting purposes.

The support extension 136 may provide an interface for users to enter troubleshooting queries and may transmit such queries to the troubleshooting system 128 at the server system 104. The support extension 136 may also be responsible for accessing delta objects or providing delta objects to the server system 104.

In some examples, the application server 120 is part of a cloud-based platform provided by a software provider that allows the user 108 to utilize the tools of the development tool 126 and the troubleshooting system 128. One or more of the application server 120, the database servers 130, the API server 122, the web server 124, the development tool 126, and the troubleshooting system 128 may each be implemented in a computer system, in whole or in part, as described below with respect to FIG. 9.

In some examples, external applications (which may be third-party applications), such as applications executing on the external server 114, can communicate with the application server 120 via the programmatic interface provided by the API server 122. For example, a third-party application may support one or more features or functions on a website or platform hosted by a third party, or may perform certain methodologies and provide input or output information to the application server 120 for further processing or publication.

Referring more specifically now to the external server 114, the external server 114 houses the LLM 118 and related processing capabilities. The external server 114 may provide an external, scalable server environment dedicated to running and serving queries to the LLM 118.

The LLM 118 may be a computational model developed for the tasks of processing, generating, and understanding human language. It employs machine learning methodologies, including deep learning architectures. The training of the LLM 118 may utilize comprehensive data sets, such as vast data sets of textual content, to enable the LLM 118 to recognize patterns in human language. The LLM 118 may be built upon a neural network framework, such as the transformer architecture. The LLM 118 may contain a significant number of parameters (e.g., in excess of a billion) which are adjusted during training to optimize performance.

The processing engine 116 may be a component running on the external server 114 that is communicatively coupled to the LLM 118. The processing engine 116 may handle certain preprocessing of data before sending it to the LLM 118 and certain postprocessing of the responses received from the LLM 118. For preprocessing, the processing engine 116 may tokenize, compress, or format the data to optimize it for the LLM 118. For postprocessing, it may format the LLM 118 response, perform detokenization or decompression, and prepare the response for sending back to the requesting system (e.g., the troubleshooting system 128).

The LLM 118 may provide natural language processing capabilities that can assist with user queries, understanding context provided by change files, understanding additional context or instructions, and generating natural language responses. In some examples, the LLM 118 has been fine-tuned on troubleshooting tasks and conversations to enhance its ability to provide useful troubleshooting insights and solutions. For example, the LLM 118 may be fine-tuned to focus specifically on queries relating to design-time changes and to deal with delta objects in a particular format (e.g., JSON format). The troubleshooting system 128 may thus integrate with the LLM 118 to add a human-like, conversational interface for users to explore change file impacts, troubleshoot, and debug issues.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
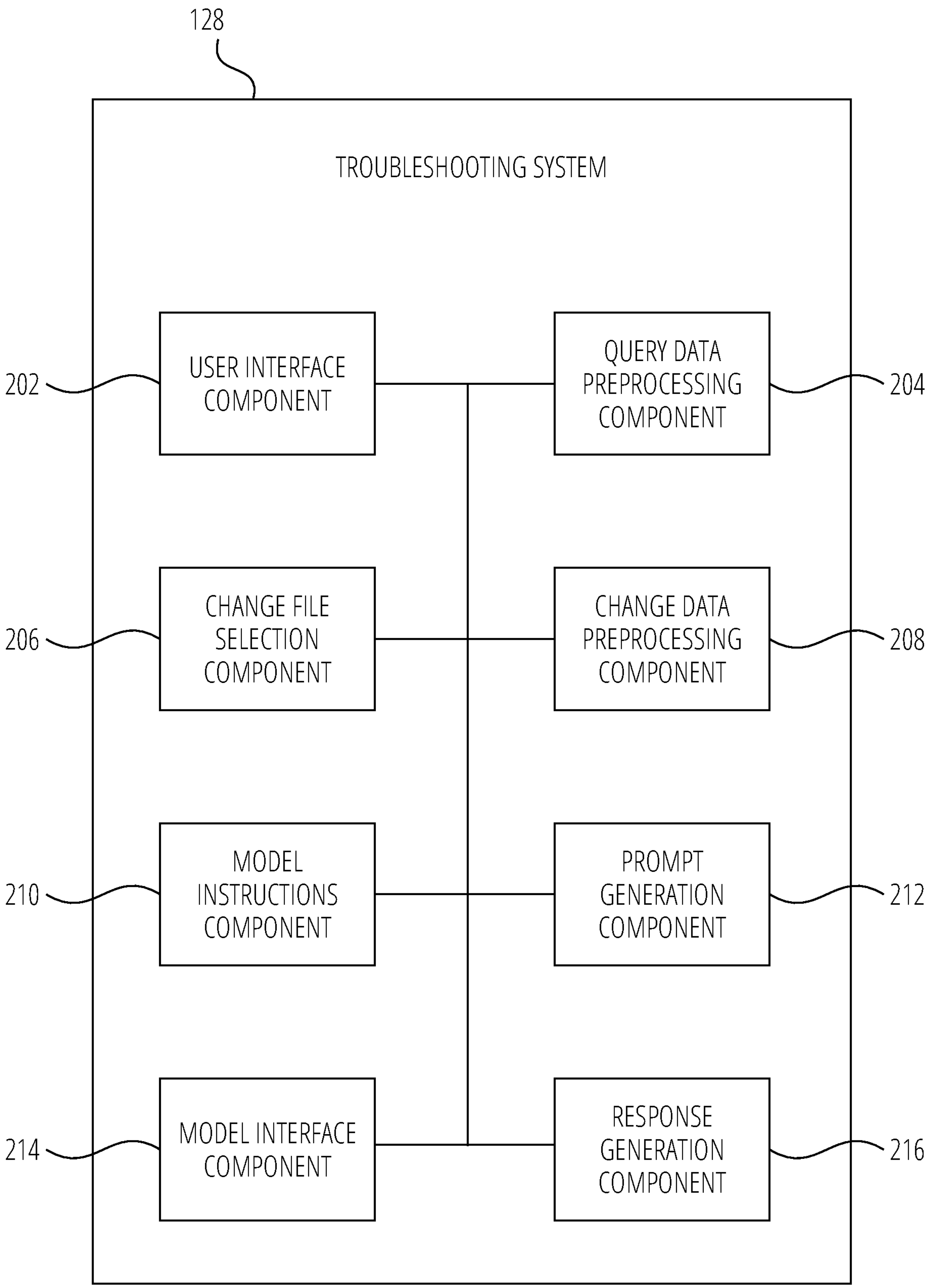
FIG. 2 is a block diagram of certain components of a troubleshooting system, according to some examples.

FIG. 2 is a block diagram illustrating certain components of the troubleshooting system 128 of FIG. 1, according to some examples. The troubleshooting system 128 is shown to include a user interface component 202, a query data preprocessing component 204, a change file selection component 206, a change data preprocessing component 208, a model instructions component 210, a prompt generation component 212, a model interface component 214, and a response generation component 216. As mentioned, while the troubleshooting system 128 is shown as residing at the server system 104 in FIG. 1, one or more components shown in FIG. 2 (or parts thereof) may, in some examples, reside or be executed at the user device 106.

In some examples, the user interface component 202 allows the troubleshooting system 128 to interface with the user device 106. For example, the user interface component 202 may communicate with the web client 112 (e.g., the support extension 136 thereof) at the user device 106 such that a user query submitted via the web client 112 is communicated to the troubleshooting system 128, and such that a response to the user query can be routed back to the user device 106.

In some examples, certain functions of the user interface component 202 are provided at the server system 104 (e.g., passing user queries on to other system components, such as the query data preprocessing component 204), while other functions of the user interface component 202 are provided at the user device 106 (e.g., rendering a user interface or displaying a response to a user query).

As mentioned, a user (e.g., the user 108) can access the troubleshooting system 128 and submit a user query. The user query may relate to one or more design-time changes made to a particular application, or a part thereof (e.g., user interface layer). Examples of user queries relating to design-time changes are provided below:

Who was the last user to change Button A?

How has Control B changed since application development started?

What was the original text in Table C?

Which user interface elements were present in Version 2 of the application that are no longer present in the application?

Which user interface elements have been added to the application since the original template was chosen?

Which design changes were made to the application after Jan. 1, 2023?

The query data preprocessing component 204 is responsible for preprocessing the user query. For example, the query data preprocessing component 204 may adjust the format of the user query or modify certain data items in the user query. In some cases, the query data preprocessing component 204 may detect that the user query includes PII and perform de-identification on the relevant data items, as is described further below. In some cases, the query data preprocessing component 204 may automatically transform the user query, or parts thereof, to reduce its overall size (e.g., perform token minimization to reduce token size).

In some examples, the user query is not preprocessed and is included in the input provided to the LLM 118 in its original form. Accordingly, preprocessing of the user query may be an optional operation.

The change file selection component 206 may determine which change files are relevant to a given user query. For example, the change file selection component 206 may determine, based on the application context, that change files relating to a certain version of an application should be selected. In another example, the change file selection component 206 may determine, based on an identifier of a user (e.g., the user 108), that all change files related to that user should be selected.

In another example, the change file selection component 206 may determine, based on content of the user query, which change files to select (e.g., the user query may relate to "Button A," in which case the change file selection component 206 filters the change files and selects only those that have delta objects relating to or affecting "Button A"). The change file selection component 206 may also filter change files by date or by application version. In some examples, the change file selection component 206 filters out redundant design-time changes. Accordingly, the change file selection component 206 may intelligently select only a subset of available change files to reduce the size or complexity of downstream inputs to the LLM 118.

The change file selection component 206 may communicate with the development tool 126 to retrieve the relevant change files. For example, the support extension 136 at the user device 106 may select or retrieve the relevant change files from a local storage of the user device 106, or the change file selection component 206 may select or retrieve the relevant change files from a server-side storage component (e.g., the database 132) associated with the development tool 126 (e.g., in cases where the development tool 126 provides a system that stores all change files in JSON format in the database 132).

The change data preprocessing component 208 is responsible for preprocessing change files. As mentioned, a change file may contain one or more delta objects. In addition to describing a design-time change made to an application, a delta object may include metadata, such as a timestamp indicating when the change was made, an identifier of an author (e.g., user or developer who made the change), details of dependencies (e.g., references to other delta objects that are related to the delta object), details of affected components (e.g., details of user interface elements affected), an identifier of a template relative to which changes are tracked, or location data (e.g., file paths).

The change data preprocessing component 208 may modify some of the data items forming part of the selected change files (e.g., the delta objects that are relevant to a given user query). Modification may include de-identification, replacing original data items with alternative data items (e.g., by hashing the original data items) to reduce the size of the data items, or combinations thereof.

De-identification may be performed by the change data preprocessing component 208 by replacing PII with alternative data items or placeholders, such as unique identifiers (e.g., USER_NAME_1, ADDRESS_2, or CLIENT_NAME_3), or replacing PII with mask characters, thereby de-identifying or redacting the PII before it is sent to the LLM 118. A correspondence matrix can be used for sensitive data fields.

In some examples, PII may be automatically replaced with encrypted tokens. Tokenization can be reversible, thereby allowing for easy recovery of the original data items. In other examples, PII may be automatically replaced with synthetic PII, thereby ensuring that the LLM 118 is still provided with appropriate input data while protecting "real" PII.

The troubleshooting system 128 may utilize de-identification or redaction functionality provided by an internal component of the troubleshooting system 128 or by an external component. For example, the troubleshooting system 128 may transmit de-identification or redaction requests to the external component via a Representational State Transfer (REST) API and receive de-identified or redacted data in response.

In some examples, change files may include relatively long or recurring strings of information. To reduce overall token size, the change data preprocessing component 208 may automatically encode certain strings or other data items in the change files using a hash function.

In some examples, in addition to (or instead of) modifying some of the data items in the selected change files, the change data preprocessing component 208 performs preprocessing by adding additional data to the change files. For example, the change data preprocessing component 208 may add runtime data associated with delta objects. The runtime data may, for example, include logs or error messages that indicate whether or not design-time changes described by the delta objects were successfully applied or persisted. The change data preprocessing component 208 may also add reversion data, such as details of any attempts to revert or undo a design-time change. Runtime data or reversion data may provide additional context that can be useful to the LLM 118.

For example, the change data preprocessing component 208 may retrieve runtime data relating to a delta object that indicates an "applyState" value for a design-time change. This may indicate whether a particular design-time change was successfully applied. The addition of runtime data may allow the LLM 118 to provide better answers to queries that depend on runtime information. For example, a user may ask: "What user interface changes were successfully carried through to Version 3 of the application?" Based on the delta objects describing the changes and additional runtime data indicating whether the changes were successful, the LLM 118 may be able to provide a more accurate, detailed, or useful response. Accordingly, in some examples, the LLM 118 may be provided with both change files and, as further context, log files.

To arrive at final prompt data to be input to the LLM 118, the troubleshooting system 128 may also add one or more predetermined instructions (or model instructions). In some examples, the model instructions component 210 is responsible for integrating such predetermined instructions into a final prompt to be provided to the LLM 118. The predetermined instructions may provide additional contextual information to the LLM 118 and may guide the LLM 118 with respect to its task or certain output requirements, such as a desired level of detail, format, and style.

For example, the predetermined instructions may indicate that a user query is provided together with delta objects, and the task is to analyze the delta objects to provide a suitable response to the user query. In another example, where certain fields in the delta objects or runtime data have specific meanings that may be difficult to interpret without further information, the predetermined instructions may explain the meanings of such fields. For example, the predetermined instructions may explain that "applyState" can have a first value that indicates that a change was persisted, and a second value that indicates that the change was not persisted. Further examples of predetermined instructions are provided below.

The prompt generation component 212 may assemble the final prompt data. For example, the prompt generation component 212 may add the user query to the modified (e.g., de-identified and shortened) delta objects, and also add the predetermined instructions and any additional information (e.g., runtime data), thereby generating the final prompt data.

The model interface component 214 is responsible for transmitting the final prompt to the LLM 118 and receiving the response from the LLM 118. For example, the model interface component 214 may handle integration with API endpoints of the LLM 118 (e.g., by communicating with the processing engine 116 of the external server 114). The prompt data may be transmitted to the LLM 118 as a single prompt. Alternatively, different portions of the prompt data may be provided separately, as is further described below.

The response generation component 216 may postprocess "raw" responses from the LLM 118 to transform the responses into final output that can be presented to a user (e.g., at the user device 106 via the web client 112). For example, where original data items where replaced with alternative or placeholder data items in order to de-identify or shorten the input prompt, and one or more of the alternative or placeholder data items appear in the response from the LLM 118, the response generation component 216 may automatically replace them with the corresponding original data items (e.g., to re-identify the information in the response to make the output understandable or relevant to the user).

The response generation component 216 may also convert the response from the LLM 118 to a predetermined format. For example, the LLM 118 may answer a user query in an unstructured format (e.g., "free text" natural language), and the response generation component 216 may convert the answer into a structured format, such as a table that lists specific design-time changes in rows and presents a comment on each design-time change in a structured manner using predetermined columns.

In some examples, at least some of the components shown in FIG. 1 or FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components.

Furthermore, according to various examples, components described herein may be implemented using a single machine, database, or device, or be distributed across multiple machines, databases, or devices.

FIG. 3 is a flowchart illustrating operations of a method 300 suitable for processing a user query related to one or more changes made to an application, and providing a response to the user query, according to some examples. By way of example and not limitation, aspects of the method 300 may be performed by the components, devices, systems, network, or databases shown in FIG. 1 and FIG. 2. Accordingly, elements shown in FIG. 1 and FIG. 2 are referred to in the description below as non-limiting examples.

The method 300 commences at opening loop element 302 and proceeds to operation 304, where the troubleshooting system 128 receives a user query. The user query may be received via a user interface, such as a troubleshooting interface presented by the support extension 136 at the user device 106 of FIG. 1.

The user query may relate to a design-time change made to the application (e.g., to the user interface layer of the application) using the development tool 126 of FIG. 1. For example, a user may select a template supported by the development tool 126 and then adapt the template during design time. The design-time changes relative to the template are then captured and stored by the troubleshooting system 128 as respective delta objects (e.g., in change files in the database 132).

At operation 306, the troubleshooting system 128 selects a subset of delta objects related to the user query. The change file selection component 206 may select a subset of delta objects from a larger set or collection of delta objects based on the application context. For example, the user query may be provided to the troubleshooting system 128 together with an identifier of the application or application version to which the user query relates, or together with a user identifier of a user that made the design-time change. Based on this application context information, the troubleshooting system 128 selects the delta objects to be provided to a machine learning model (e.g., the LLM 118 of FIG. 1).

The method 300 may include preprocessing the delta objects at operation 308. For example, and as discussed elsewhere, after extracting the relevant delta objects (e.g., from one or more JSON files), data items forming part of the delta objects may be de-identified or shortened (e.g., using a hash function). At operation 310, the troubleshooting system 128 adds one or more predetermined instructions to the user query and the selected delta objects. The predetermined instructions may be natural language instructions. Non-limiting examples of predetermined instructions include:

- contextual information relating to the delta objects (e.g., "A set of delta objects has been provided in JSON format. Each delta object describes a design-time change made to a user interface associate with an application.");
- contextual information relating to the application (e.g., "The name of the application is [NAME] and the application provides functions [FUNCTION_1] and [FUNCTION_2].");
- a task specification (e.g., "Your task is to review the delta objects and additional information provided and provide a detailed response to the query.");
- a role assigned to the machine learning model (e.g., "You are a technical expert and you specialize in the review of change files to troubleshoot issues in software applications.");
- a prescribed output format or style for the response (e.g., "Provide your response in plain language" or "Provide your response in bullet point format."); or
- output constraints (e.g., "Limit your response to 200 words or less.")

In some examples, the predetermined instructions may include examples to guide the machine learning model. For example, the predetermined instructions may include an example user query and an example response in the desired format and style.

The predetermined instructions may also include model-specific instructions, such as model parameters. For example, the predetermined instructions may include LLM parameters that relate to settings or configurations of a language model, such as temperature or sampling parameters.

First data that includes the user query and the delta object may thus be preprocessed to obtain second data that includes the user query, modified delta objects, and additional information or instructions. The second data may serve as a prompt. The method 300 includes providing, by the troubleshooting system 128, the prompt to the machine learning model (e.g., the LLM 118) at operation 312.

At operation 314, the troubleshooting system 128 then receives a response from the machine learning model. For example, the model interface component 214 of FIG. 2 may receive a natural language response that addresses the initial user query. The method 300 may include postprocessing the response at operation 316. For example, the response may be converted to a structured format for presentation in the user interface at the user device 106.

In some examples, additional data may be added to the response during the postprocessing operation. For example, the troubleshooting system 128 may automatically generate a visual representation of relevant delta objects (based on the response from the machine learning model) and any dependencies or relationships between them (e.g., using arrows to indicate dependencies between delta objects identified as relevant by the machine learning model).

At operation 318, final output (e.g., the postprocessed response from the machine learning model) is caused to be presented at the user device 106. For example, the troubleshooting system 128 may transmit the final output for presentation by the support extension 136 at the web client 112. In some examples, the user may be enabled to submit further user queries, such as a follow-up query in response to the output presented at operation 318. The follow-up query may then be forwarded to the machine learning model by the troubleshooting system 128 and its response may again be handled as described above. In this way, the user can be provided with a conversational interface to facilitate troubleshooting and to obviate or significantly reduce the need for manual review of delta objects by the user. The method 300 concludes at closing loop element 320.

Figure 4:
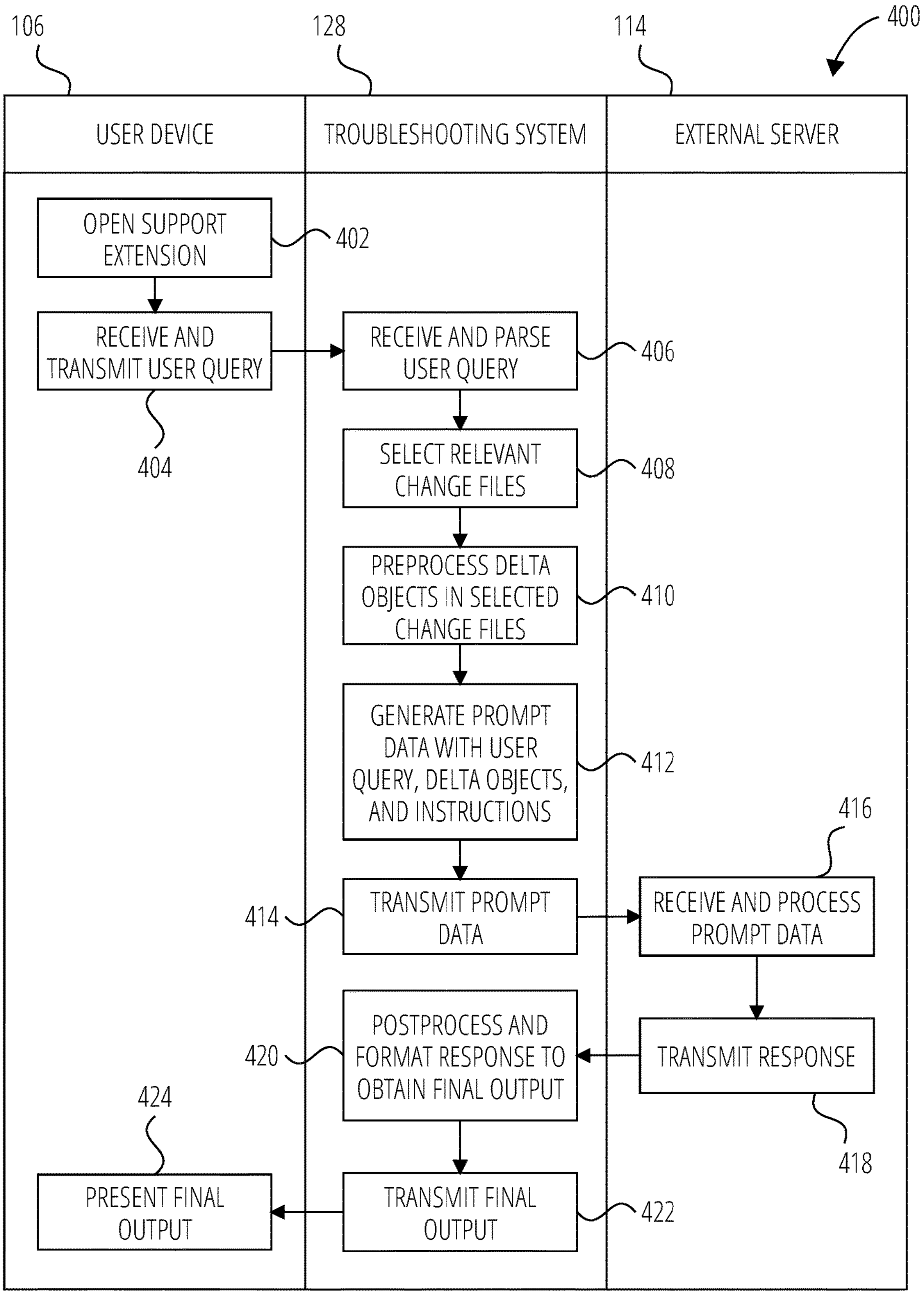
FIG. 4 is a swim lane flowchart illustrating operations respectively performed by a user device, a troubleshooting system, and an external server in a method suitable for processing a user query related to one or more changes made to an application, and providing a response to the user query, according to some examples.

FIG. 4 is a swim lane flowchart illustrating operations performed by a user device, a troubleshooting system, and an external server in a method 400 suitable for processing a user query related to one or more changes made to an application, and providing a response to the user query, according to some examples. By way of example and not limitation, aspects of the method 400 may be performed by the components, devices, systems, network, or databases shown in FIG. 1 and FIG. 2. Accordingly, in FIG. 4, the user device, the troubleshooting system, and the external server are the user device 106, the troubleshooting system 128, and the external server 114 of FIG. 1, respectively.

Referring firstly to operation 402 in FIG. 4, a user (e.g., the user 108) accesses the web client 112 on the user device 106 and opens the support extension 136 to gain access to the troubleshooting system 128. It is noted that a browser extension is a non-limiting example and the troubleshooting system 128 may be accessed in various ways, such as via a conventional web client or via a programmatic client (e.g., the programmatic client 110 of FIG. 1).

At operation 404, the user device 106 receives the user query via the troubleshooting interface provided by the support extension 136 and transmits the user query to the troubleshooting system 128. In the method 400, the user query is a natural language query. In some examples, the user device 106 may also transmit delta objects from a local storage of the user device 106 to the troubleshooting system 128 for processing.

The troubleshooting system 128 receives and parses the user query (operation 406), selects a subset of change files (operation 408), and preprocesses delta objects contained in the selected change files (operation 410), as described in greater detail elsewhere. For example, a given delta object is contained in a change file that describes a change with respect to a template and previous change files that are related to the given change file. The change files are preprocessed by performing de-identification (e.g., masking private or possibly sensitive user or customer information) and by token minimization (e.g., using a hash function). The preprocessing may also include adding additional context, such as explanations of fields, values, or variables in the delta objects.

At operation 412, the troubleshooting system 128 then generates prompt data that includes the user query, the selected delta objects (e.g., as modified during the preprocessing operation), and predetermined instructions, such as a model role, an output format, or additional contextual information (e.g., the field, value, or variable explanations) to guide the model.

The prompt data is transmitted to the external server 114 by the troubleshooting system 128 at operation 414, for processing by the LLM 118. In some examples, the user query, the delta objects, and the predetermined instructions are provided as a single set of prompt data (e.g., a single, consolidated input prompt). In other examples, certain items in the prompt data may be provided separately. For example, the user query can be provided specifically as a "prompt," while the delta objects and predetermined instructions can be provided separately as context to support the prompt. This may facilitate the efficient transmission of follow-up user queries, where the LLM 118 can use the previously submitted delta objects and predetermined instructions and receive a new (follow-up) query after responding to a first user query. In another example, the user query and the predetermined instructions can be merged by the troubleshooting system 128 and provided to the LLM 118 as a "prompt," while the delta objects are provided in a separate file as context to support the prompt.

Accordingly, in some examples, the LLM 118 may encode respective input items into separate vector representations, and then analyze the vector representations together to provide a response that addresses the user query, but is influenced or guided by the additional data (e.g., delta objects, instructions, or other context). An output vector may be decoded into natural language text by the LLM 118 and provided as the response.

The external server 114 receives the prompt data and uses the LLM 118 to process the prompt data at operation 416. A response is generated at the external server 114 and then transmitted back to the troubleshooting system 128 at operation 418. At operation 420, the troubleshooting system 128 performs postprocessing on the response from the LLM 118. For example, de-identified data items are re-identified. In another example, placeholders or tokens that were included to replace original data items to reduce the size of the prompt data may be replaced by the original data items.

The troubleshooting system 128 obtains final output for presentation to the user and transmits the final output to the user device 106 (operation 422). At operation 424, the final output is presented in the user interface (e.g., the troubleshooting interface provided at the web client 112).

Figure 5:
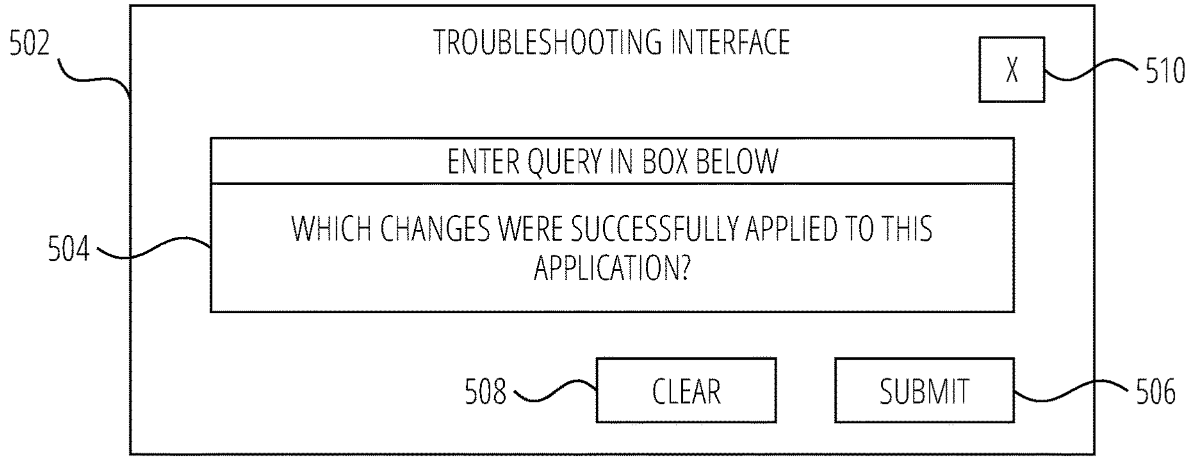
FIG. 5 is a user interface diagram illustrating a troubleshooting interface presented at a user device during a first stage, according to some examples.

FIG. 5 is a user interface diagram illustrating a troubleshooting interface 502 presented at a user device (e.g., the user device 106 of FIG. 1) during a first stage, according to some examples. The troubleshooting interface 502 may be provided as part of a support extension (e.g., the support extension 136 of FIG. 1), as part of a dedicated web application, or as part of an app installed at the user device.

During the first stage, the troubleshooting interface 502 provides a user query section 504 in which the user can enter a user query (e.g., "Which changes were successfully applied to this application?"). The troubleshooting interface 502 further provides a submit button 506 that can be selected to submit the user query to the troubleshooting system 128 for processing, and a clear button 508 which can be selected to clear current input from the user query section 504. A close button 510 can be selected to close the support tool provided by the troubleshooting system 128.

In some examples, the troubleshooting system 128 handles the generation of final prompt data that includes the user query, one or more relevant delta objects, and additional information or instructions. Accordingly, the user merely has to submit the user query, while the final prompt data, as well as the response to the user query, are automatically generated.

Figure 6:
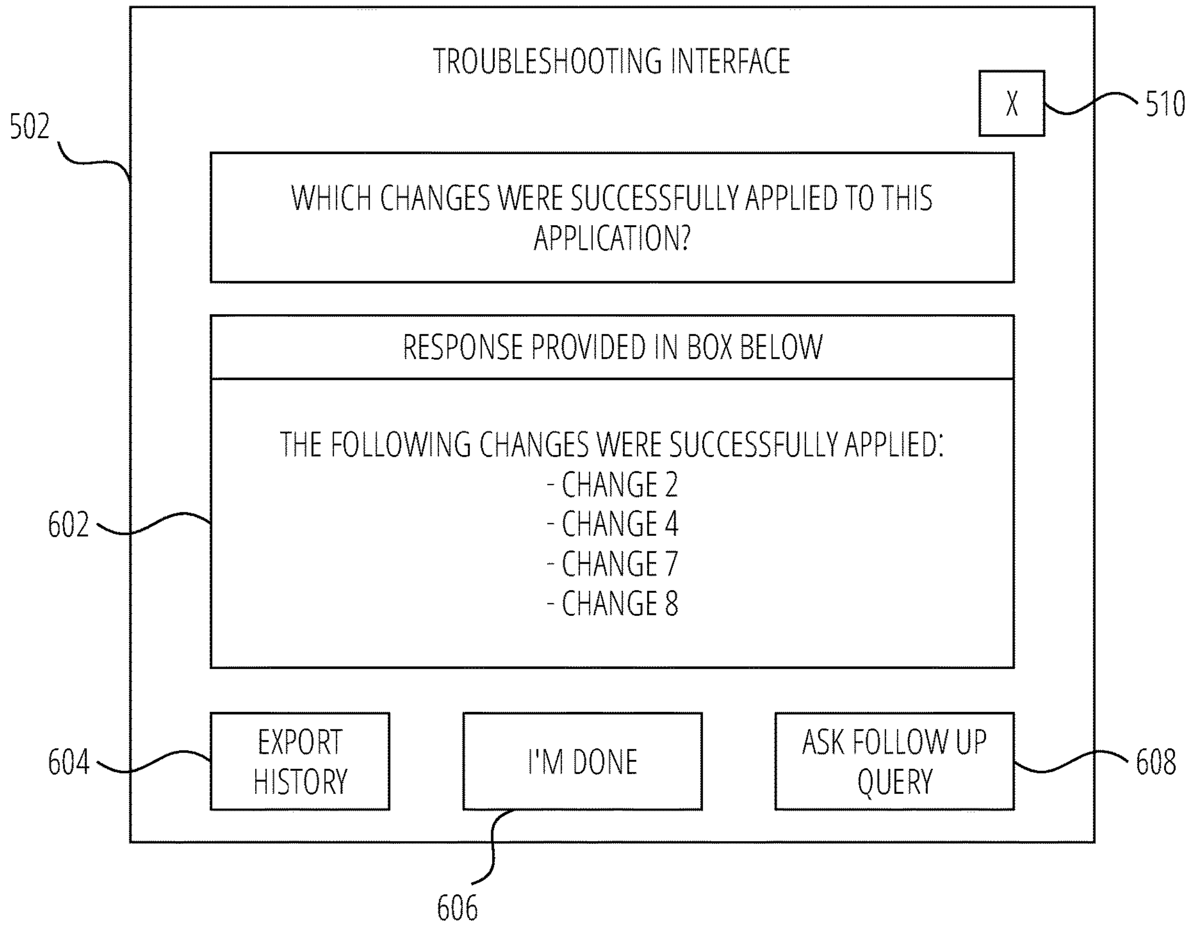
FIG. 6 is a user interface diagram illustrating the troubleshooting interface of FIG. 5 during a second stage, according to some examples.

FIG. 6 is a user interface diagram illustrating the troubleshooting interface 502 of FIG. 5 during a second stage, according to some examples. In response to the user entering the user query in the user query section 504 of FIG. 5 and selecting the submit button 506, the troubleshooting interface 502 is updated to include an output section 602. The output (e.g., the response from the machine learning model, as postprocessed by the troubleshooting system 128) is then presented in the output section 602, as shown in the example of FIG. 6.

The troubleshooting interface 502 also, during the second stage, provides an export history button 604 that allows the user to export the current conversation (e.g., download it to local storage), a complete button 606 that concludes the conversation, and a follow up query button 608 that allows the user to enter a follow-up user query and continue with the current conversation. For example, the user may input a series of user queries as follows:

1. First user query: "Which changes were applied to Button A?"
2. First automated response: "Changes 1, 2, and 3, were made to Button A."
3. Second user query: "When was each change made?"
4. Second automated response: "Change 1 was made on Jan. 5, 2023 at 08:00, Change 2 was made on Jan. 5, 2023 at 08:30, and Change 3 was made on Jan. 8, 2023 at 15:15."
5. Third user query: "Who made these changes?"
6. Third automated response: "Changes 1 and 2 were made by Key User A, and Change 3 was made by Key User B."

7. Fourth user query: "Were these changes successfully persisted in the application?"
8. Fourth automated response: "Yes, based on the runtime data I have access to, these changes were successfully implemented."

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: accessing first data comprising a plurality of delta objects and a user query, the plurality of delta objects identifying design-time changes made to an application using a development tool, and the user query having been received via a user interface and relating to at least one of the design-time changes; preprocessing the first data to obtain second data, the preprocessing of the first data comprising modifying a subset of the first data and adding one or more predetermined instructions to the first data; providing the second data to a machine learning model to obtain a response to the user query; and causing presentation, in the user interface, of output indicative of the response.

In Example 2, the subject matter of Example 1 includes, wherein the design-time changes comprise changes made to a user interface layer of the application, the user interface layer is based on a template supported by the development tool, and each delta object tracks one or more of the design-time changes relative to the template and any earlier delta objects related to the delta object.

In Example 3, the subject matter of any of Examples 1-2 includes, wherein the modifying of the subset of the first data reduces an overall token size thereof.

In Example 4, the subject matter of any of Examples 1-3 includes, wherein the modifying of the subset of the first data comprises: replacing original data items in the first data with alternative data items.

In Example 5, the subject matter of Example 4 includes, wherein the replacing of the original data items in the first data with alternative data items results in de-identification of the first data, the operations further comprising: postprocessing the response from the machine learning model to obtain the output for presentation in the user interface, the postprocessing comprising performing re-identification by replacing one or more alternative data items included in the response from the machine learning model with one or more corresponding original data items from the first data.

In Example 6, the subject matter of any of Examples 4-5 includes, wherein the alternative data items comprise placeholder data items that reduce an overall token size of the first data.

In Example 7, the subject matter of Example 6 includes, the operations further comprising: postprocessing the response from the machine learning model to obtain the output for presentation in the user interface, the postprocessing comprising replacing one or more placeholder data items included in the response from the machine learning model with one or more corresponding original data items from the first data.

In Example 8, the subject matter of any of Examples 1-7 includes, wherein the one or more predetermined instructions comprise at least one of: contextual information relating to the plurality of delta objects, contextual information relating to the application, a task specification, a role assigned to the machine learning model, a prescribed output format for the response, or one or more output constraints.

In Example 9, the subject matter of Examples 1-8 includes, wherein the response from the machine learning model is a natural language response in an unstructured format, and the operations further comprise: postprocessing the response from the machine learning model to obtain the output for presentation in the user interface, the postprocessing comprising converting the response from the unstructured format to a structured format.

In Example 10, the subject matter of any of Examples 1-9 includes, wherein the preprocessing comprises: retrieving runtime data indicating whether one or more of the design-time changes were successfully applied; and including the runtime data in the second data.

In Example 11, the subject matter of any of Examples 1-10 includes, wherein each of the plurality of delta objects is stored in a respective change file that describes one or more of the design-time changes.

In Example 12, the subject matter of any of Examples 1-11 includes, the operations further comprising: identifying an application context associated with the application; and selecting, based on the application context, the plurality of delta objects from a larger set of delta objects for inclusion in the first data.

In Example 13, the subject matter of any of Examples 1-12 includes, wherein the user interface comprises a troubleshooting interface of the development tool, the operations further comprising: causing the troubleshooting interface to be presented at a user device; and receiving the user query via the troubleshooting interface presented at the user device.

In Example 14, the subject matter of any of Examples 1-13 includes, wherein the machine learning model comprises a large language model (LLM), the user query is a natural language query, and the one or more predetermined instructions comprise natural language instructions.

Example 15 is a method comprising: accessing first data comprising a plurality of delta objects and a user query, the plurality of delta objects identifying design-time changes made to an application using a development tool, and the user query having been received via a user interface and relating to at least one of the design-time changes; preprocessing the first data to obtain second data, the preprocessing of the first data comprising modifying a subset of the first data and adding one or more predetermined instructions to the first data; providing the second data to a machine learning model to obtain a response to the user query; and causing presentation, in the user interface, of output indicative of the response.

In Example 16, the subject matter of Example 15 includes, wherein the design-time changes comprise changes made to a user interface layer of the application, the user interface layer is based on a template supported by the development tool, and each delta object tracks one or more of the design-time changes relative to the template and any earlier delta objects related to the delta object.

In Example 17, the subject matter of any of Examples 15-16 includes, wherein the modifying of the subset of the first data reduces an overall token size thereof.

Example 18 is a non-transitory computer-readable medium that stores instructions that, when executed by one or more processors, cause the one or more processors to perform operations comprising: accessing first data comprising a plurality of delta objects and a user query, the plurality of delta objects identifying design-time changes made to an application using a development tool, and the user query having been received via a user interface and relating to at least one of the design-time changes; preprocessing the first data to obtain second data, the preprocessing of the first data comprising modifying a subset of the first data and adding one or more predetermined instructions to the first data; providing the second data to a machine learning model to obtain a response to the user query; and causing presentation, in the user interface, of output indicative of the response.

In Example 19, the subject matter of Example 18 includes, wherein the design-time changes comprise changes made to a user interface layer of the application, the user interface layer is based on a template supported by the development tool, and each delta object tracks one or more of the design-time changes relative to the template and any earlier delta objects related to the delta object.

In Example 20, the subject matter of any of Examples 18-19 includes, wherein the modifying of the subset of the first data reduces an overall token size thereof.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
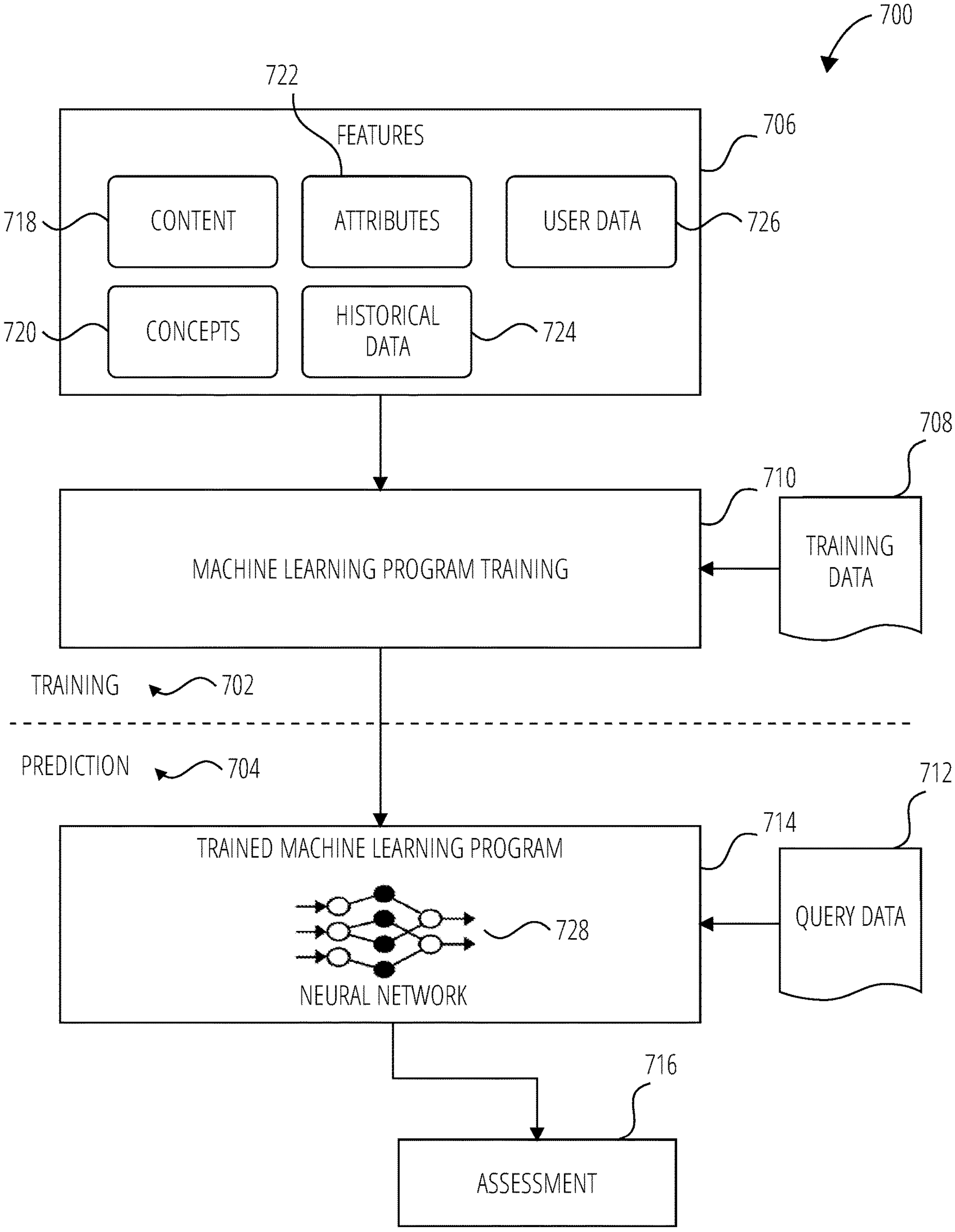
FIG. 7 diagrammatically illustrates training and use of a machine learning program, according to some examples.

FIG. 7 is a block diagram showing a machine learning program 700, according to some examples. Machine learning programs, also referred to as machine learning algorithms or tools, may be used as part of the systems described herein to perform one or more operations, e.g., to identify relations between reported issues and context data, to identify contextual dependencies, to extract or infer additional issue metadata using initial issue metadata, to generate priority ratings, to generate estimated impacts, or combinations thereof.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 708 in order to make data-driven predictions or decisions expressed as outputs or assessments (e.g., assessment 716). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 700 supports two types of phases, namely training phases 702 and prediction phases 704. In training phases 702, supervised learning, unsupervised or reinforcement learning may be used. For example, the machine learning program 700 (1) receives features 706 (e.g., as structured or labeled data in supervised learning) and/or (2) identifies features 706 (e.g., unstructured or unlabeled data for unsupervised learning) in training data 708. In prediction phases 704, the machine learning program 700 uses the features 706 for analyzing query data 712 to generate outcomes or predictions, as examples of an assessment 716.

In the training phase 702, feature engineering is used to identify features 706 and may include identifying informative, discriminating, and independent features for the effective operation of the machine learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

The concept of a feature in this context is related to that of an explanatory variable used in statistical techniques such as linear regression. Choosing informative, discriminating, and independent features is important for the effective operation of the machine learning program 700 in pattern recognition, classification, and regression. Features may be of different types, such as numeric features, strings, and graphs.

In training phases 702, the machine learning program 700 uses the training data 708 to find correlations among the features 706 that affect a predicted outcome or assessment 716.

With the training data 708 and the identified features 706, the machine learning program 700 is trained during the training phase 702 at machine learning program training 710. The machine learning program 700 appraises values of the features 706 as they correlate to the training data 708. The result of the training is the trained machine learning program 714 (e.g., a trained or learned model).

Further, the training phases 702 may involve machine learning, in which the training data 708 is structured (e.g., labeled during preprocessing operations), and the trained machine learning program 714 implements a relatively simple neural network 728 capable of performing, for example, classification and clustering operations. In other examples, the training phase 702 may involve deep learning, in which the training data 708 is unstructured, and the trained machine learning program 714 implements a deep neural network 728 that is able to perform both feature extraction and classification/clustering operations.

A neural network 728 generated during the training phase 702, and implemented within the trained machine learning program 714, may include a hierarchical (e.g., layered) organization of neurons. For example, neurons (or nodes) may be arranged hierarchically into a number of layers, including an input layer, an output layer, and multiple hidden layers. Each of the layers within the neural network 728 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 704, the trained machine learning program 714 is used to perform an assessment. Query data 712 is provided as an input to the trained machine learning program 714, and the trained machine learning program 714 generates the assessment 716 as output, responsive to receipt of the query data 712.

In some examples, the trained machine learning program 714 may be a generative artificial intelligence (AI) model. Generative AI is a term that may refer to any type of AI that can create new content. For example, generative AI can produce text, images, video, audio, code, or synthetic data. In some examples, the generated content may be similar to the original data, but not identical.

Some of the techniques that may be used in generative AI are:

- CNNs: CNNs may be used for image recognition and computer vision tasks. CNNs may, for example, be designed to extract features from images by using filters or kernels that scan the input image and highlight important patterns.
- RNNs: RNNs may be used for processing sequential data, such as speech, text, and time series data, for example. RNNs employ feedback loops that allow them to capture temporal dependencies and remember past inputs.
- GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code. For example, the LLM 118 of FIG. 1 may be a transformer model, or may be based on a transformer model.

In generative AI examples, the assessment 716 generated as a response or output by the trained machine learning program 714 may include predictions, translations, summaries, answers to questions, suggestions, media content, or combinations thereof. For example, the LLM 118 of FIG. 1 may generate natural language responses.

In some examples, a machine learning model may be fine-tuned. The term "fine-tuning," as used herein, generally refers to a process of adapting a pre-trained machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model. For example, the LLM 118 may be fine-tuned using training data that includes delta objects and user queries, as well responses to the user queries, to improve its performance on dealing with user queries that relate to design-time changes made to applications.

Figure 8:
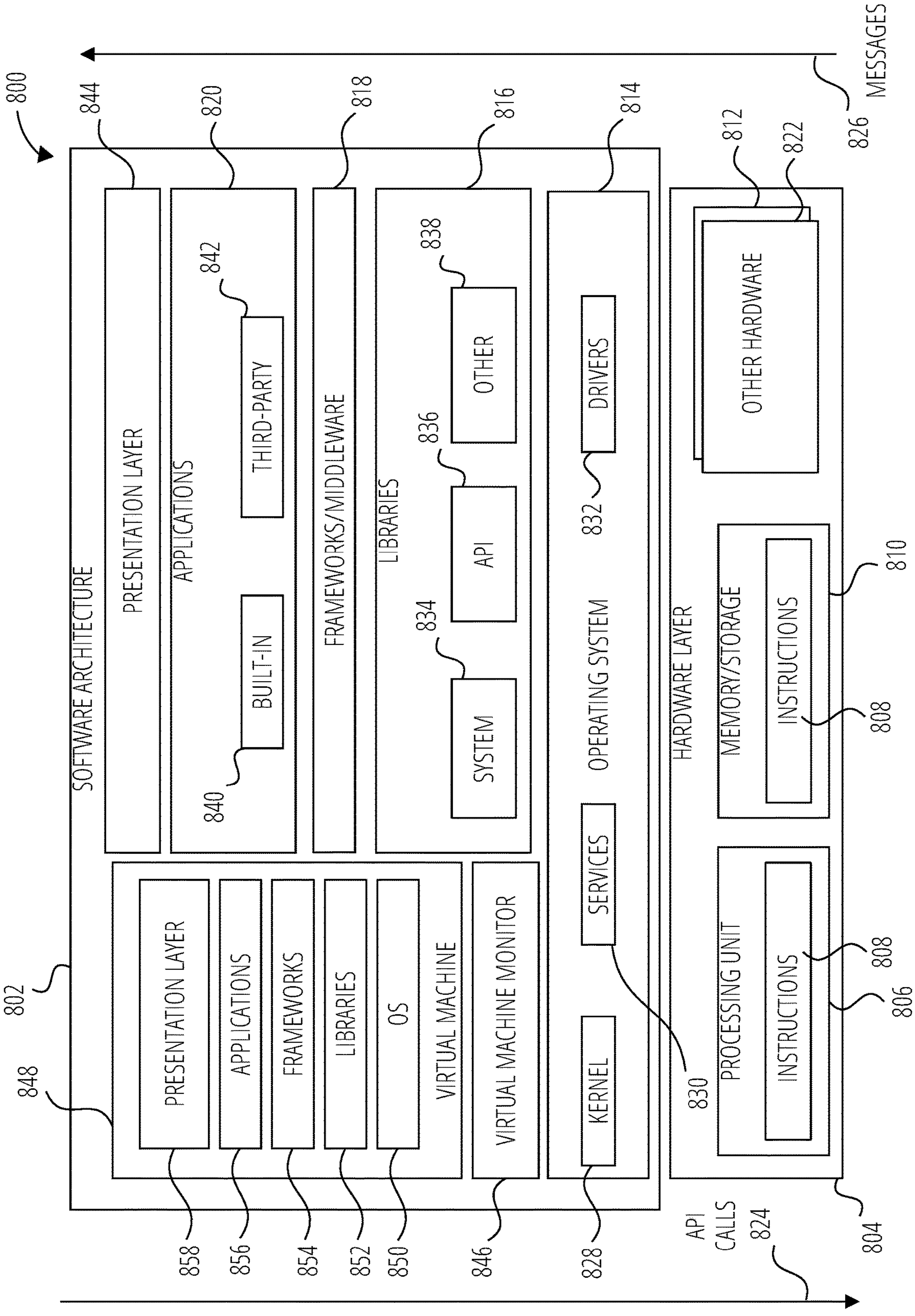
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 9:
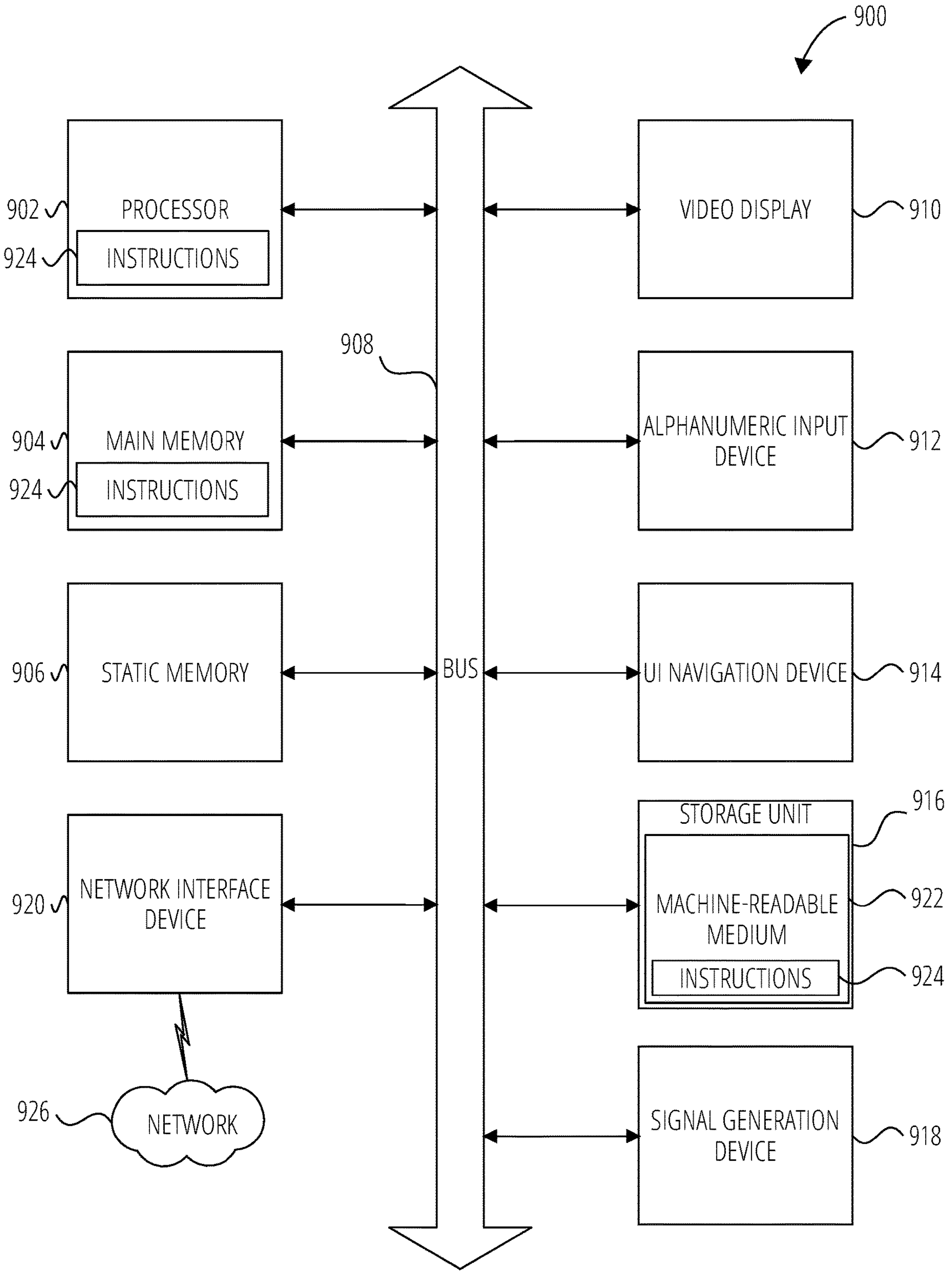
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one memory that stores instructions; and one or more processors configured by the instructions to perform operations comprising:

accessing first data comprising a plurality of delta objects and a user query, the plurality of delta objects identifying design-time changes made to an application using a development tool, and the user query having been received via a user interface and relating to at least one of the design-time changes;

preprocessing the first data to obtain second data, the preprocessing of the first data comprising modifying a subset of the first data and adding one or more predetermined instructions to the first data, and modifying the subset of the first data comprises identifying the design-time changes that are successfully persisted and the design-time changes that are successfully reverted;

providing the second data to a machine learning model to obtain a response to the user query, the response comprising an identification of the design-time changes that are successfully persisted and the design-time changes that are successfully reverted; and causing presentation, in the user interface, of output indicative of the response.

2. The system of claim 1, wherein the design-time changes comprise changes made to a user interface layer of the application, the user interface layer is based on a template supported by the development tool, and each delta object tracks one or more of the design-time changes relative to the template and any earlier delta objects related to the delta object.

3. The system of claim 1, wherein the modifying of the subset of the first data reduces an overall token size thereof.

4. The system of claim 1, wherein the modifying of the subset of the first data comprises:

replacing original data items in the first data with alternative data items.

5. The system of claim 4, wherein the replacing of the original data items in the first data with alternative data items results in de-identification of the first data, the operations further comprising:

postprocessing the response from the machine learning model to obtain the output for presentation in the user interface, the postprocessing comprising performing re-identification by replacing one or more alternative data items included in the response from the machine learning model with one or more corresponding original data items from the first data.

6. The system of claim 4, wherein the alternative data items comprise placeholder data items that reduce an overall token size of the first data.

7. The system of claim 6, the operations further comprising:

postprocessing the response from the machine learning model to obtain the output for presentation in the user interface, the postprocessing comprising replacing one or more placeholder data items included in the response from the machine learning model with one or more corresponding original data items from the first data.

8. The system of claim 1, wherein the one or more predetermined instructions comprise at least one of: contextual information relating to the plurality of delta objects, contextual information relating to the application, a task specification, a role assigned to the machine learning model, a prescribed output format for the response, or one or more output constraints.

9. The system of claim 1, wherein the response from the machine learning model is a natural language response in an unstructured format, and the operations further comprise:

postprocessing the response from the machine learning model to obtain the output for presentation in the user interface, the postprocessing comprising converting the response from the unstructured format to a structured format.

10. The system of claim 1, wherein the preprocessing comprises:

retrieving runtime data for the subset of the first data, the runtime data indicating the design-time changes that are successfully applied and the design-time changes that are unsuccessfully applied;

retrieving reversion data for the subset of the first data, the reversion data indicating the design-time changes that are successfully reverted and the design-time changes that are unsuccessfully reverted, and including the runtime data and the reversion data in the second data, wherein identifying the design-time changes that are successfully persisted and the design-time changes that are successfully reverted is based on the runtime data and the reversion data.

11. The system of claim 1, wherein each of the plurality of delta objects is stored in a respective change file that describes one or more of the design-time changes.

12. The system of claim 1, the operations further comprising:

identifying an application context associated with the application; and selecting, based on the application context, the plurality of delta objects from a larger set of delta objects for inclusion in the first data.

13. The system of claim 1, wherein the user interface comprises a troubleshooting interface of the development tool, the operations further comprising:

causing the troubleshooting interface to be presented at a user device; and receiving the user query via the troubleshooting interface presented at the user device.

14. The system of claim 1, wherein the machine learning model comprises a large language model (LLM), the user query is a natural language query, and the one or more predetermined instructions comprise natural language instructions.

15. A method comprising:

accessing first data comprising a plurality of delta objects and a user query, the plurality of delta objects identifying design-time changes made to an application using a development tool, and the user query having been received via a user interface and relating to at least one of the design-time changes;

preprocessing the first data to obtain second data, the preprocessing of the first data comprising modifying a subset of the first data and adding one or more predetermined instructions to the first data, and modifying the subset of the first data comprises identifying the design-time changes that are successfully persisted and the design-time changes that are successfully reverted;

providing the second data to a machine learning model to obtain a response to the user query, the response comprising an identification of the design-time changes that are successfully persisted and the design-time changes that are successfully reverted; and causing presentation, in the user interface, of output indicative of the response.

16. The method of claim 15, wherein the design-time changes comprise changes made to a user interface layer of the application, the user interface layer is based on a template supported by the development tool, and each delta object tracks one or more of the design-time changes relative to the template and any earlier delta objects related to the delta object.

17. The method of claim 15, wherein the modifying of the subset of the first data reduces an overall token size thereof.

18. A non-transitory computer-readable medium that stores instructions that, when executed by one or more processors, cause the one or more processors to perform operations comprising:

accessing first data comprising a plurality of delta objects and a user query, the plurality of delta objects identifying design-time changes made to an application using a development tool, and the user query having been received via a user interface and relating to at least one of the design-time changes;

preprocessing the first data to obtain second data, the preprocessing of the first data comprising modifying a subset of the first data and adding one or more predetermined instructions to the first data, and modifying the subset of the first data comprises identifying the design-time changes that are successfully persisted and the design-time changes that are successfully reverted;

providing the second data to a machine learning model to obtain a response to the user query, the response comprising an identification of the design-time changes that are successfully persisted and the design-time changes that are successfully reverted; and causing presentation, in the user interface, of output indicative of the response.

19. The non-transitory computer-readable medium of claim 18, wherein the design-time changes comprise changes made to a user interface layer of the application, the user interface layer is based on a template supported by the development tool, and each delta object tracks one or more of the design-time changes relative to the template and any earlier delta objects related to the delta object.

20. The non-transitory computer-readable medium of claim 18, wherein the modifying of the subset of the first data reduces an overall token size thereof.

* * * * *